Jan. 8, 1935.  R. VALVERDE  1,987,167
BIMETAL THERMOSTAT ELEMENT
Filed June 30, 1933
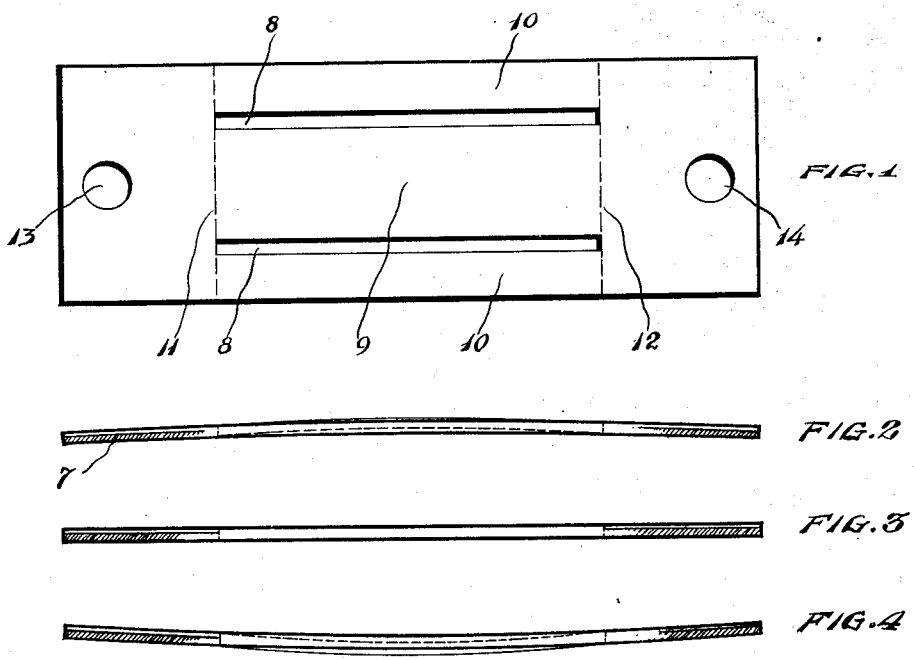

Patented Jan. 8, 1935

1,987,167

UNITED STATES PATENT OFFICE 1,987,167

BIMETAL THERMOSTAT ELEMENT

Robert Valverde, New York, N. Y.

Application June 30, 1933, Serial No. 678,349

9 Claims. (Cl. 297—15)

This invention relates to bimetal thermostat elements, and more specifically to that class which operates with a snap action when subjected to a change of temperature.

Such thermostat elements obtain a snap action by having portions of their surface constrained into lines which are not straight so that part or all of the surface is buckled. When heated the warping of the bimetal is opposed by the buckled surface until the warping stresses are sufficient to cause the surface to buckle in the opposite sense. This sudden motion is called a snap action.

The main purpose of these snap action bimetal elements is to provide a thermostat which will snap at a given temperature, that is to say, the problem is a control problem.

One purpose of my invention is to obtain a snap action at given temperatures more readily than heretofore.

Another purpose is to obtain this snap action temperature control without sacrificing the sudden motion and large displacement of a useful snap action.

The position of unstable equilibrium taken by my thermostat in the midst of the snap action is the snap position.

The snap action obtained on heating is the heat snap and that obtained on cooling is the cool snap; the resulting positions of rest are the heat snap and cool snap positions.

In my drawing, the position of the thermostat is shown at various temperatures.

Expanding parts of my bimetal elements means increasing the longest dimension of the part along its axis. This axis is the line passing through the centers of gravity of the cross-sections of the part.

Where one end of the expanded central strip is free there would be some temperature at which the plate would regain its original flatness; this is the median temperature for that bimetal plate. At this median temperature the plate can retain either the heat snap or cold snap positions.

The usefulness of a snap action thermostat increases directly with its ability to control. The smaller the difference between the heat snap and cold snap temperature the better its ability to maintain a given temperature when operating such apparatus as an electric heater, for instance. This difference expressed as a percent of the temperature to be maintained is the regulation of the snap action thermostat.

The combination of good regulation with a powerful snap action of considerable amplitude is due to the generation of maximum stresses during the snap action. The bimetal thermostat element of this invention has a central strip and two lateral strips so related and curved that they produce a snap action utilizing almost 100% of the possible stress intensity of the metal of the strips.

The central strip of my bimetal element is loaded at both ends by the elastic lateral strips of bimetal which confine the central strip of the slotted bimetal plate. The effect of change of temperature on such a system causes the lateral strips to be stretched as the central strip warps from its flexed position to that of a straight column. However, in this stress system, elongation of the lateral strips is accompanied by an increase of load. Hence, as soon as the central strip warps beyond the lines of force of the lateral strips it buckles into an opposite curve, relieving the compressive forces in the central strip and the tension of the lateral strips. Thus we have a bimetal surface, capable of a snap action, in which the maximum stresses, within the elastic limits of the bimetal, may be set up to make this snap action a maximum in velocity and displacement.

Instead of controllably compressing the lateral strips to create the load, a simpler structure obtains by controllably expanding the central strip in a special manner to be described.

The construction and operation of the invention will be more readily understood by referring to the accompanying drawing, in which, Fig. 1 is a plan view of the preferred form of my slotted bimetal plate with an expanded central strip; and Figs. 2–4 are side elevations of the bimetal plate of Fig. 1, showing the different positions taken by the strips during a cycle of operation.

The thickness of the plate and the curves are exaggerated in the drawing for clearness. The lamination 7 with the greater coefficient of expansion is shown partly shaded at the ends of the side views.

The bimetal plate shown in Fig. 1 has two slots 8—8 punched out to form, between dotted lines 11 and 12, a central strip 9 and two lateral strips 10. Subsequent fabrication to produce my snap action thermostat element is confined principally to the area between the dotted lines 11 and 12. Holes 13 and 14 punched in the ends are for mounting the plate and for attaching a feather spring contact or other driven device.

The central strip 9 is expanded uniformly between mutilated steel rolls of special design. As the plate feeds into these rolls it is deflected by a wedge shaped guide and given a slight overall curve, as shown in Fig. 2. A mutilated bead on one roll permits the lateral strips 10 and the end portions beyond 11 and 12 to pass through unexpanded while the gauge of the central strip 9 between 11 and 12 is reduced. With a plate having a thickness of .025 inch, this reduction may be about .0003 inch. The mutilated bead on the roll may have an elevation of about .001 inch. The curved and expanded plate comes out of the rolls with the central strip bulging only a few thousandths of an inch above the lateral strips. The gauge of this bimetal is held between very close limits so that the amount of elongation of the central strip 9 can be accurately controlled.

Fig. 2 shows the bimetal plate at room temperature. The central strip buckles slightly above the lateral strips. The slight curve of the lateral strips is partly acquired from pre-forming the plate and partly caused by the end thrust of the buckled central strip where it joins the end portions of the plate along the lines 11 and 12. All of the strips have a simple curvature. The terms "simple curve" and "simple curvature" are used in this specification to indicate a curve which is free from reverse curves throughout its length.

As the temperature of the plate rises, the bottom lamination, which has the greater coefficient of expansion, increases in length and causes the plate to flatten into the position shown in Fig. 3. The central strip is compressed and the lateral strips are put under tension as the unequal expansion of the laminations of the bimetal causes the strips to flatten. The importance of the simple curvature of the strips is apparent as the strips flatten because any reverse curve resulting in any substantial wave or kink in either the central or lateral strips would provide a point where the metal would bend without setting up the enormous compression and tension forces obtained with this invention.

In Fig. 3 the central strip is substantially flat and its upper and lower surfaces are substantially flush with the surfaces of the lateral strips. Elongation tests on the embodiment of the invention shown in the drawing, in which the central strip is wider and of greater cross-section than both of the lateral strips taken together, show a momentary increase in the total length of the plate caused by stretching of the lateral strips as the plate passes through the snap position shown in Fig. 3.

A further rise in temperature with continued unequal expansion of the laminations of the bimetal causes the plate to warp into an opposite curvature to that which it has at room temperature (Fig. 2). As soon as this opposite curvature begins, and the tension force of the lateral strips is no longer in line with the compression force of the central strip, these tension and compression forces causes the strips to snap into positions shown in Fig. 4. The compression in the central strip is relieved by the buckling of this strip into a curve extending below the lateral strips, and the relief of the compression force of the central strip automatically relieves the tension in the lateral strips.

If the temperature of the plate decreases, the lower lamination of the bimetal contracts more rapidly than the upper lamination and causes the plates to flatten toward the snap position shown in Fig. 3, and sets up similar compression and tension forces in the strips to cause the plate to snap back into the position shown in Fig. 2 as soon as it passes through the position of unstable equilibrium shown in Fig. 3.

Although the operation has been described with the snap occurring above room temperature, the snap can be made to occur at any temperature by giving the plate the correct initial curvature. For example, if the plate were in the position shown in Fig. 4 at room temperature, the snap would occur below room temperature.

This application is a continuation in part of application Serial No. 394,104, filed September 20, 1929.

I claim as my invention:

1. A one-piece slotted bimetal plate integrally forming a central strip and two lateral strips, said central strip being longitudinally expanded with respect to the lateral strips to form a simple developable curve.

2. A thermostat element comprising a one-piece slotted bimetal plate forming a central strip and two lateral strips, said central strip being expanded at a given temperature, along its axis so that said central strip at the given temperature is longer than the plate between the ends of said central strip, and whereby said central strip is caused to flex beyond the surface of the plate in a simple developable curve.

3. A slotted bimetal plate integrally forming a central strip and two lateral strips, said central strip having a cross-section greater than the combined cross-sections of said lateral strips, and said central strip being expanded longitudinally to cause it to take the form of a developable surface of simple curvature.

4. A bimetallic thermoresponsive plate having slots therein forming a central strip and two lateral strips, the said central strip having an initial permanent stress along its operative length, whereby said central strip is bowed into a surface of simple curvature, said two lateral strips being normally shorter than the central strip to maintain the stress in said central strip.

5. A curved bimetallic slotted plate forming a central strip and two lateral strips, said central strip being expanded longitudinally to form a developable surface of simple curvature, which surface on heating becomes substantially flush with the surface of the plate, said central strip becoming substantially flat before buckling with a snap action into a position of opposite curvature.

6. A curved bimetallic slotted plate forming a central strip and two lateral strips, said central strip having a developable surface of simple curvature, which surface on change of temperature buckles with a snap action to an opposite curvature, all curved surfaces of the plate being curved toward the same side at any given time.

7. A one-piece slotted bimetal plate integrally forming a central strip and two lateral strips, said central strip being expanded longitudinally to form a developable surface of simple curvature, and of greater length than said lateral strips so that the central strip is under longitudinal compression maintained by tension of said lateral strips, the tension in said lateral strips and the compression in said central strip increasing gradually with change of temperature until a snap action occurs.

8. In a thermal responsive device, a one-piece bimetal plate having lateral side strips and a central strip separated from the side strips by parallel slots which terminate short of the ends of the plate, the length of the central strip being greater than that of the side strips, and all portions of the plate having a simple curvature in the same direction when the plate is below its median temperature.

9. In a thermal responsive device, a one-piece bimetal plate having a central strip, and side strips separated from the central strip by slots which terminate short of the ends of the plate, the central strip being of a different length than the side strips, all of said strips being bowed in the same direction when below the median temperature of the plate and being free from reverse curves so that the forces which cause snap action of the plate, when it passes through its median temperature, are compression and tension stresses in the strips.

ROBERT VALVERDE.